United States Patent [19]

Reiback

[11] 4,261,657

[45] Apr. 14, 1981

[54] OPTICAL DISPLAY DEVICE

[76] Inventor: Earl M. Reiback, 20 E. 9th St., New York, N.Y. 10003

[21] Appl. No.: 932,329

[22] Filed: Aug. 9, 1978

[51] Int. Cl.³ .............................................. G03B 21/06
[52] U.S. Cl. ........................................ 353/10; 353/74; 353/65
[58] Field of Search ................. 350/144, 127; 353/10, 353/65-67, 74; 272/8 P, 8 R; 40/427, 431

[56] References Cited

U.S. PATENT DOCUMENTS

| 1,167,502 | 1/1916 | Huffman et al. | 40/411 X |
| 1,528,506 | 3/1925 | Opacki | 40/431 |
| 1,699,689 | 1/1929 | Curry | 272/8 M |
| 1,798,358 | 3/1931 | Slachter | 40/411 |
| 2,576,147 | 11/1951 | Sauvage | 350/144 X |
| 3,096,389 | 7/1963 | Dudley | 353/10 X |
| 3,609,339 | 9/1971 | Smith | 353/1 X |
| 3,868,501 | 2/1975 | Barbour | 362/811 X |

FOREIGN PATENT DOCUMENTS

| 16238 | 7/1934 | Australia | 353/67 |
| 134380 | 7/1933 | Austria | 353/66 |
| 514631 | 11/1939 | United Kingdom | 353/66 |

*Primary Examiner*—Harry N. Haroian
*Attorney, Agent, or Firm*—Hubbell, Cohen, Stiefel & Gross

[57] ABSTRACT

An optical display device for creating the illusion of an object floating in space comprises a lens means having the optical properties of a convex lens, a housing for supporting the lens and an object such that the light path from the object to the lens is greater than the focal length of the lens and means for illuminating the object.

4 Claims, 3 Drawing Figures

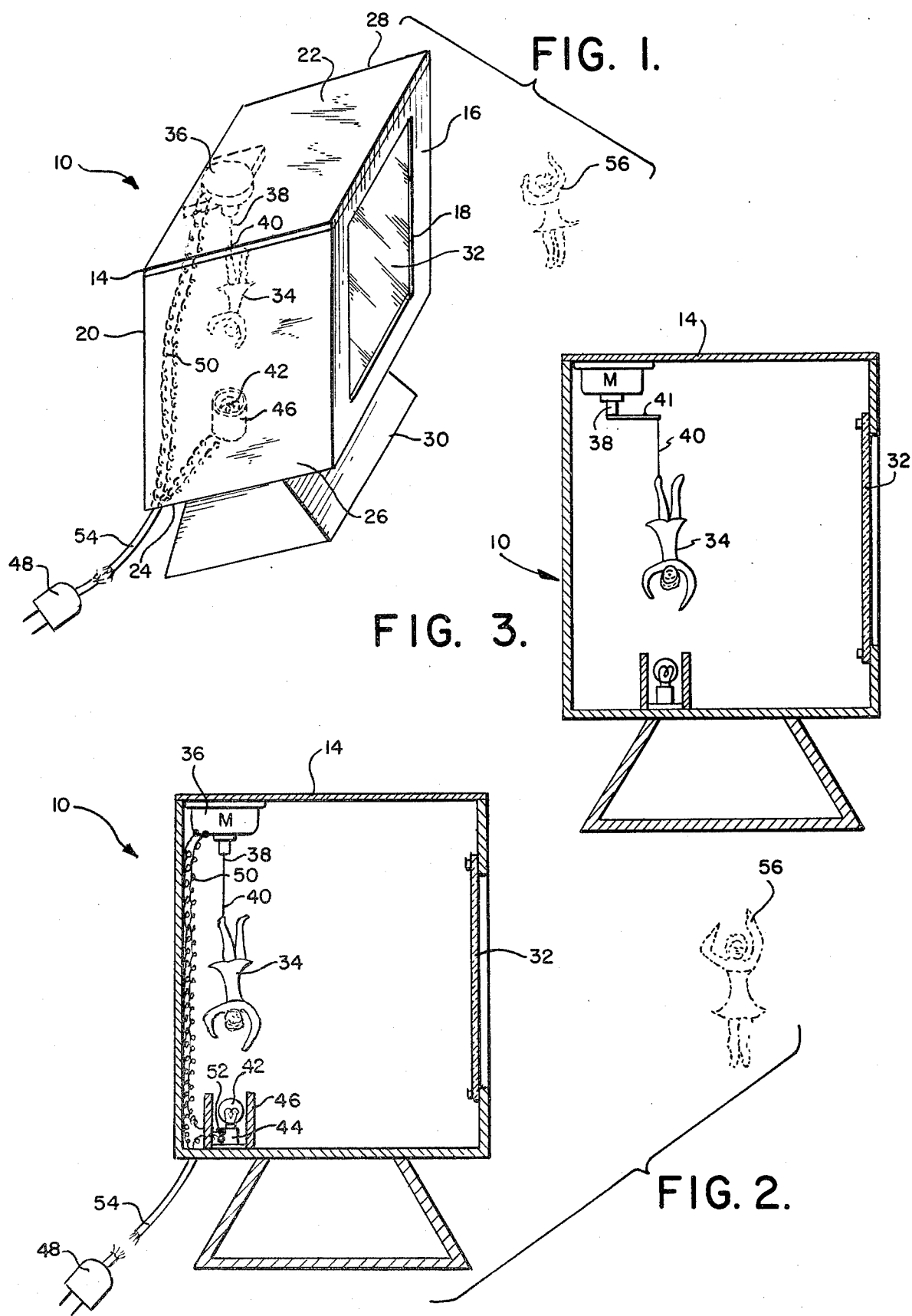

OPTICAL DISPLAY DEVICE

BACKGROUND OF THE INVENTION

1. Field of the Invention

This invention pertains to optical display devices and more particularly to optical display devices of the type capable of creating the illusion of an object floating in space.

2. Statement of the Prior Art

Devices capable of creating an illusion of an object floating in space are known. For example, U.S. Pat. Nos. 995,607, 2,628,533 and 3,647,284 all disclose devices capable of creating the illusion of an object floating in space. However, in each instance, the illusion is created by multiple reflections off one or more concave mirrored surfaces. Applicant is also aware of the use of lasers to effect the illusion of objects floating in space. However, the high cost of lasers renders this technique impractical for numerous applications.

SUMMARY OF THE INVENTION

According to the invention, I have developed a novel device for creating the illusion of an object floating in space. In its preferred embodiment, the device includes lens means having the optical properties of a convex lens, a housing for supporting the lens and the object and means for illuminating the object. The object is preferably positioned substantially on the axis of the lens in which case the spacing between the object and the lens must be greater than the focal length of the lens. When the object is illuminated by the illuminating means which may comprise, for example, a light bulb, or the ambient light of the room, a real image of the object will be formed on the opposite side of the lens and will appear to float in space. The exact position and size of the real image will depend on the actual position of the object relative to the lens.

I presently prefer to employ a Fresnel lens as the lens means since Fresnel lenses having short focal lengths and large areas, and thus low focal ratios are readily available and are relatively inexpensive. A short focal length is desirable since the image formed by a lens having short focal length will require a shorter object to lens distance, and a large lens area is desirable since this provides a larger area of relatively sharp focus in front of the central area of the lens.

A further advantage of a Fresnel lens is that it has a light weight compared to the equivalent glass lens and a smaller chromatic aberration and spherical aberration compared to a glass lens. The lower aberration of the Fresnel lens away from the center portion provides for a larger veiwable real image and a greater depth of field for the real image.

The preferred device according to the invention also includes a motor for rotating the object in the housing whereby the real image formed by the device will also be in rotation. The effect is to enhance the illusion created by the device.

A further effect of the motor can be to oscillate the object forward and backwards which creates a far greater apparent oscillation of the real image thrusting forward and backwards than the actual motion.

Among the possible modifications is one in which a mirror is used to reflect an image of the object to the lens rather than reflecting light directly off the object to the lens. When this is done, the light path from the object to the lens must be greater than the focal length of the lens. Also possible is the placement of a mirror on the viewing side of the lens between the lens and the point where the real image would otherwise be formed. By adjusting the angle of this mirror, the real image formed by this device may be made to appear at a variety of different points in space.

Further features of the display device of the present invention and possible modifications thereto will be more fully apparent from the following detailed description and annexed drawing of the preferred embodiments thereof.

BRIEF DESCRIPTION OF THE DRAWINGS

In the drawings:

FIG. 1 is a perspective view of the preferred embodiment of the display device of the present invention; and FIG. 2 is a vertical section of the device shown in FIG. 1.

FIG. 3 is an alternative embodiment showing an alternative movement means.

DETAILED DESCRIPTION OF THE PREFERRED EMBODIMENTS

Referring now to FIGS. 1 and 2, the preferred optical display device 10 according to the present invention is shown. As presently preferred, the device 10 includes a generally rectangular housing 14 including a front 16 having a preferably square hole 18 therein, a back 20, a top 22, a bottom 24, sides 26 and 28 and a base 30. A lens 32, the optical properties of which will be described hereinafter, is secured, preferably at its periphery, to the housing 14 in the hole 18. While this may be done in a number of ways, it is presently preferred to make the hole smaller than the lens 32 and to provide a plurality of spaced holes (not shown) in the periphery of the lens such that the lens may be disposed on the inside surface of the front 16 of housing 14 such that none of the holes in the lens periphery overly the hole 18. The lens 32 may then be secured to the front 16 by wood screws or the like which extend through the holes and into the housing.

For reasons that will be more fully apparent hereinafter, an object, here shown to be a figurine 34, is secured to the housing 14 within the projected area of the lens 32. As presently preferred and shown, the object 34 is not secured directly to the housing. Instead, a motor 36 having a shaft 38 is secured to the inner surface of the top 22 of the housing 14 such that the shaft 38 extends downward. The object 34 is secured to one end of a preferably substantially transparent or black thin string, thread, rod or the like 40, the other end of which is secured to the shaft 38 for rotation therewith. The object 34 must be disposed relative to the lens such that the path length traveled by light reflected off the object to the lens 32 is greater than the focal length thereof. If this is not the case, the lens will simply magnify the object and not form a real image of the object.

Device 10 also includes means for illuminating the object 34, here shown to comprise a bulb 42 fitted in a socket 44. As presently preferred and shown, the socket 44 is secured to the bottom 24 of the housing 14 by a plurality of screws or nails (not shown) which extend through holes in a flange in the socket. Of course, this could be done in a number of other ways readily apparent to those skilled in the art. A shield 46 is preferably interposed between the bulb 42 and the lens 32 to block the light coming directly from the lamp from impinging on the lens surface. Preferably, both the motor 36 and the bulb 42 operate on AC power which may, for example, be supplied from a standard wall outlet (not shown) via a plug 48 and wires 50, 52 and 54. Preferably, the inside surfaces of the housing are blackened as by a matte black paint or other light absorbent material to prevent extraneous reflections off the inside walls from reaching the lens 32.

Assuming this arrangement is used, when the plug 48 is plugged into a wall socket, the object 34 will be rotated by the motor 36 and illuminated by the bulb 42. The light reflected from the object 34 through the lens 32 will establish a real image of the object 32 at 56. The image will, of course, be inverted. Thus, if the object 34 is one, such as the figurine shown in FIG. 1, which has an expected orientation, its orientation should be inverted so that the real image is properly oriented.

Assuming the lens 32 is a thin lens, the distance of the image 56 from the plane of the lens 20 may be approximated from the equation $$d_I = f \cdot d_O / d_O - f$$

where $d_I$ is the distance of the image 56 from the plane of the lens 32, $d_O$ is the distance of the object 34 from the plane of the lens 32 and f is the focal length of the lens 32. Similarly, the size of the real image may be approximated from the equation $$S_I = d_I \cdot S_O / d_O$$

where $S_I$ is the size of the image and $S_O$ is the size of the object.

Due to the rotation imparted to the object 34 by the motor 36, the image created by the device 10 at 56 will also be in rotation, which not only enhances the illusion but also serves to catch the observer's eye which may be important if, for example, the device 10 is used as a display advertisement in which case the observer will not have been instructed to look for the real image formed at 56.

The lens 32 may comprise any lens or combination of lenses having the optical properties of a convex lens. Both single and double convex lenses are acceptable. For a number of reasons, I presently prefer to employ a Fresnel lens. These reasons include the much lighter weight of a Fresnel lens over its equivalent thick lens with the same diameter and focal length; the lower cost of a Fresnel lens, and the reduced spherical aberration and coma capable of being designed economically into a Fresnel lens, thus creating a clearer, less smeared image which is required if the illusion created by the device 10 is to be effective. The real image 56 of the object 34 which appears to float in space in front of the lens 32 is enhanced if the image at 56 is relatively bright. The image brightness is not only dependent on the intensity of the light reflected off the object but also is dependent on the size of the lens 32 and its focal length. A large lens with a short focal length has a focal ratio equal to f/D where f is the focal length of the lens and D is its diameter, and the brightness of the image at 56 is inversely proportional to the focal ratio squared. It will therefore be apparent that it is desirable to employ a lens 20 having a relatively low focal ratio, in other words, one whose focal length is relatively short as compared with its diameter. This is best accomplished with a Fresnel lens. Ordinary single convex lenses fitting this description, in addition to being quite expensive, normally have a large spherical aberration which precludes all the rays transmitted through the lens from being sharply focused at one point. The result is that the image is spread out and not clear thus reducing the effectiveness of the illusion created by the device 10. This can be minimized with a Fresnel lens. Although good image formation can be obtained with a multiple element lens, such lenses are, as already noted, quite expensive, particularly if the diameter is to exceed more than a few inches. Furthermore, if a lens having a relatively small diameter is to be employed, the person observing the illusion of the device 10 would have to line up substantially exactly with the lens 32 and the object 34 in order to see the real image at 56.

Thus, and as noted above, a Fresnel lens is particularly suited for use in the device 10 since it provides good image formation, can be designed to reduce spherical aberration and coma (minimal aberrations) and is relatively inexpensive, even for lenses having relatively large diameters and low focal ratios. For example, I currently employ two Fresnel lenses glued together at their peripheries having an 11 inch diameter and a combined 5½ inch focal length (focal ratio=0.5) and find that the real image of the object 34 is bright and adequately focused. Furthermore, the real image established at 56 can be viewed from positions off the lens axis, which, as noted above, is not the case when a lens having a substantially smaller diameter is employed.

Skilled workers in the art will recognize that in order to establish a real image of the object 34 and 56, the distance $d_I$ from the object 34 to the lens 32 must be greater than the focal length f thereof. I have found that when my preferred combined Fresnel lens having a 5½ inch focal length is used, the illusion created by the device 10 is particularly effective when the object 34 is spaced about 8½ inches from the lens 32. It will therefore be apparent that if a one piece housing 14 is used, the depth of the housing must be greater than the focal length of the lens 32. It will also be apparent that the object 34 need not be rotated in which case the motor 36 will not be necessary. However, I prefer to have the object 34 rotated since, as noted above, rotation of the real image at 56 enhances the illusion created by the device 10. Motions of the object toward and away from the lens may also be used to advantage. As the object approaches the lens, and approaches a distance close to the focal length, the apparent motion of the image will be much greater than actual motion of the object. Also, the size of the object will increase, enhancing the illusion of the object coming forward in space. The motion may increase and decrease the distance from the object to the lens with either a rotational motion or a linear pendulum motion or a combination of both. For example, the object 34 could be secured at the end of a pendulum or suspended from a member 41 extending horizontal from shaft 38 to provide simultaneous rotational and transverse motion. Part 40 is preferably transparent or black so that a real image thereof will not be highly visible as this would detract from the illusion created by the device 10.

Use of the shield 46 is desirable since it prevents the observer from viewing the bulb 42 through the lens 32 and also avoids the formation of a real image of the bulb. It also avoids scattering light from the facets of the Fresnel lens 32. As an alternative, the light source could be located at other positions, such as in the base 30, so that the light from the bulb does not shine directly on the lens, with an aperture is provided in the bottom 26 so that the light illuminates the object 34.

Whatever technique is employed, it should be borne in mind that in order to obtain a bright real image at 56 there must be sufficient light reflected from the object 34 to the lens 32. As an alternative, the object 34 could be replaced with, or used in conjunction with, a graphic image 57, located beyond the focal length of the lens, the graphic image being either opaque and front lit with the light source, or translucent and rear lit by the light source. This graphic image will be seen to project forward into the space in front of the lens.

It should be apparent that illuminating means other than the bulb 42 may be employed to illuminate the object 34. For example, in a highly simplified version of the optical device 10 of the present invention, light for illuminating the object 34 comprises ambient light. In the embodiment illustrated in FIGS. 1 and 2, for example, this could be accomplished by eliminating the bulb 42 and removing the back 20 of the housing 14. However, it is not desirable to rely solely on ambient light as the real image formed at 56 is not nearly as bright as when independent illuminating means, such as the bulb 42, are employed.

The skilled art worker will also recognize that the housing 14 may be constructed of any suitable material having the necessary rigidity although, primarily for reasons of economy, I prefer to employ flakeboard. However, the use of numerous other materials such as, for example, wood, plastic or wood having a plastic finish is also possible. Similarly, the walls and base of the housing may be secured together in any number of ways such as by nails, screws, a suitable adhesive or any other means. The use of an adhesive is presently preferred.

Moreover, numerous housings other than the housing 14 illustrated in FIGS. 1 and 2 may be employed. Thus, the housing need only be constructed such that it is capable of supporting the lens 32 and the object 34 such that at least a portion of the light reflected from the object passes through the lens and that the distance traveled by the light between the object and the lens is greater than the focal length thereof. For example, in a simplified version, the housing need only include two parts. One part would support the lens while the other, which could comprise, for example, a stand, would serve to support the object within the projected area of the lens. Of course, if optional features such as the motor 36 and bulb 42 are included, it is desirable that the housing be capable of supporting them also.

Still further modifications are possible. For example, it will be apparent that more than one object may be positioned behind the lens such that the light reflected off these objects will pass through the lens thus creating multiple real images. Furthermore, it is not absolutely necessary that the object itself be placed behind the lens in order to create the illusion of the device 10 discussed above. For example, an image of the object could be used. This could be accomplished, for example, by using a mirror positioned such that light from the reflected image of the object is directed through the lens. It will thus be apparent that it is only necessary that light reflected off the object be directed through the lens and that this may be accomplished directly, or, as just noted, indirectly as by employing one or more mirrors. However, regardless of the technique employed, it is important that the angle between the light rays reflected off the object to the lens is not so large that no real image is formed. This is, of course, dependent on the particular lens employed. Therefore, the object is preferably positioned on the axis of the lens. In the case where light from a reflected image of the object is directed through the lens, the reflected image will preferably lie on the lens axis. As a further possible modification, an additional mirror can be disposed on the viewing side of the lens between the lens and the point where the real image would otherwise appear. By varying the angle of the mirror, the real image may be made to appear at a variety of different points in space.

Since these as well as further changes and modifications are intended to be within the scope of the present invention, the above description should be construed as illustrative and not in the limiting sense, the scope of the invention being defined by the following claims.

What is claimed is:

1. An optical display device comprising:
   a housing having one open side;
   Fresnel lens means having the optical property of a convex lens having a focal length f, said fresnel lens means mounted in said one open side of said housing;
   illuminating means positioned within said housing for illuminating a three-dimensional object;
   motor means secured to the top of said housing and having a shaft extending downwardly therefrom;
   a transverse member extending substantially horizontally from said shaft means and secured thereto, and a substantially non-light reflective member extending downwardly from said transverse member and secured thereto;
   a three-dimensional object suspended from said non-light reflective member;
   said three-dimensional object and said lens being relatively positioned for directing a portion of the light from said illuminating means reflected off the three-dimensional object through one side of said lens, said object being disposed from said lens at a distance greater than said lens focal lens f, the length of the path travelled by said light portion from said three-dimensional object to said lens being greater than said lens focal lens f, whereby a real image of said three-dimensional object is formed in space on the other side of said lens, said real image giving the visual effect of said three-dimensional object being suspended in space;
   said motor means cooperating with said shaft means, said transverse member, and non-light reflective member to impart transverse and rotational motion to said object;
   said motor means imparting periodic motion to said object in a path having a major component substantially on the axis of said lens, whereby the size of said real image increases and decreases as the object moves along the axis of said lens without substantial movement of said object on said axis.

2. An optical display device according to claim 1, further comprising
   mirror means for reflecting at least a portion of the light from said object incident thereon through said lens.

3. An optical display device according to claim 1, wherein said illuminating means comprises a light source secured to said housing means.

4. An optical display device according to claim 1, wherein said illuminating means comprises ambient light.

* * * * *